United States Patent [19]
Gough

[11] 3,714,169
[45] Jan. 30, 1973

[54] PHOSPHATE ESTERS OF HOMOPHTHALIMIDES

[75] Inventor: Stanley T. D. Gough, Edison, N.J.

[73] Assignee: Mobil Oil Corporation

[22] Filed: March 4, 1970

[21] Appl. No.: 16,588

[52] U.S. Cl.........260/283 P, 260/281, 260/283 CW, 424/258
[51] Int. Cl. .............................................C07d 35/30
[58] Field of Search ....................260/283 P, 289, 281

[56] References Cited

UNITED STATES PATENTS

| | | | |
|---|---|---|---|
| 2,545,283 | 3/1951 | Johnson | 260/281 |
| 3,114,761 | 12/1963 | Price | 260/281 |
| 3,312,706 | 4/1967 | Rigterink | 260/281 |

OTHER PUBLICATIONS

Harriman et al. Jour. Am. Chem. Soc. Vol. 67 p. 1481, (1945)

*Primary Examiner*—Donald G. Daus
*Attorney*—Oswald G. Hayes, Andrew L. Gaboriault and Mitchell G. Condos

[57] ABSTRACT

Phosphate ester derivatives of N-substituted homophthalimides form a new class of insecticides. They are highly effective against the Mexican Bean Beetle, Southern Armyworm and Spider Mite in standard insecticide dip test methods. They are highly effective against the Housefly and Bean Aphid in standard insecticide spray test methods. They are also highly effective against the Southern Corn Rootworm in the standard insecticide soil mix test method.

3 Claims, No Drawings

PHOSPHATE ESTERS OF HOMOPHTHALIMIDES

BACKGROUND OF THE INVENTION

Field of the Invention

This invention is directed to novel phosphate ester insecticides. More particularly, it is concerned with phosphate ester derivatives of N-substituted homophthalimides and their use as highly effective insecticides.

SUMMARY OF THE INVENTION

This invention provides compounds having the formula

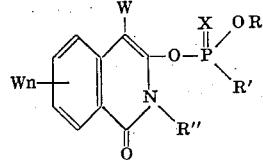

wherein R is alkyl (e.g., $C_1$–$C_3$), alkenyl (e.g., $C_2$–$C_4$), alkynyl (e.g., $C_2$–$C_4$), aryl, substituted alkyl, or substituted aryl, R' is R, OR, SR, NHR or $NR_2$, R'' is hydrogen or R, X is oxygen or sulfur, W is hydrogen, halogen, cyano, nitro, R, R',—COOR,—COR, SR or $SO_2R$, and n is an integer of from 1 to 4; their use as insecticides; and insecticidal composition comprising at least one such compound and a carrier therefor.

DESCRIPTION OF SPECIFIC EMBODIMENTS

As will be noted from the formula, the compounds of this invention are phosphate ester derivatives of N-substituted homophthalimides. Non-limiting examples of the compounds of this invention include:

0,0-diethyl-0-3-(N-ethyl-isoquinolin-1-on)yl thiophosphate;
0,0-diethyl-0-3-(isoquinolin-1-on)yl thiophosphate;
0,0-diethyl-0-3-(N-ethyl-isoquinolin-1-on)yl phosphate;
0,0-diethyl-0-3-(N-ethyl-4-ethyl-isoquinolin-1-on)yl thiophosphate;
0,0-diethyl-0-3-(N-ethyl-4-chloro-isoquinolin-1-on)yl thiophosphate;
0,0-diethyl-0-3-(N-ethyl-4-cyano-isoquinolin-1-on)yl thiophosphate;
0,0-diethyl-0-3-(N-ethyl-4,7-dichloro-isoquinolin-1-on)yl thiophosphate;
0,0-diphenyl-0-3-(N-phenyl-isoquinolin-1-on)yl thiophosphate;
0,0-dimethyl-0-3-(N-methyl-isoquinolin-1-on)yl thiophosphate;
0,0-dimethyl-0-3-(N-methyl-4-chloro-isoquinolin-1-on)yl thiophosphate;
0,0-dimethyl-0-3-(N-methyl-4-chloro-isoquinolin-1-on)yl phosphate; and
0,0-diethyl-0-3-(N-methyl-4-chloro-isoquinolin-1-on)yl phosphate.

The compounds of the present invention are readily prepared by the general procedure: An appropriate N-substituted homophthalimide is reacted with sodium in ethanol to give the sodium salt of the homophthalimide. The sodium salt of the homophthalimide is then reacted with an appropriate phosphorochloridothionate in benzene to yield an oily product upon refluxing, separating and evaporating.

The appropriate N-substituted homophthalimide is easily prepared by the method of J.A.C.S. 67, 1481, 1945, in which a homophthalic acid is reacted with an appropriate amine. Other appropriate starting materials are disclosed by the following references:

(1) Academie Des Sciences, June 1959, pages 3568 to 3570; (2) Journal of the Chemical Society, 1937, pages 1312 to 1314; (3) Comp. Rend. Vol. 246, 1956, pages 3255 to 3257; (4) Journal of the Chemical Society, 1956, pages 2477 to 2481; (5) Journal of the Chemical Society, 1955, pages 3518 to 3521; and (6) Journal of the Chemical Society (U.S.S.R.) Vol. 16, 1946, pages 301 to 307 (Chemical Abstracts, Vol. 41: 425F).

The following examples demonstrate the typical procedures.

EXAMPLE 1

N-ethyl-homophthalimide (J.A.C.S. 67, 1481, 1945)

30.0 g. of homophthalic acid was added to 70 ml. of 70 percent aqueous ethylamine. The solution was heated to 180°C. and evaporated. Cooling and recrystallization from aqueous acetic acid gave 20.0 g. of product with a melting point of 103°–104°C.

EXAMPLE 2

0,0-diethyl-0-3-(N-ethyl-isoquinolin-1-on)yl thiophosphate 16.0 g. of N-ethyl-homophthalimide was added to a solution of 1.9 g. sodium in 150 ml. of ethanol. The solution was refluxed for 2 hours, then cooled and evaporated to give 18.1 g. of the sodium salt of the homophthalimide.

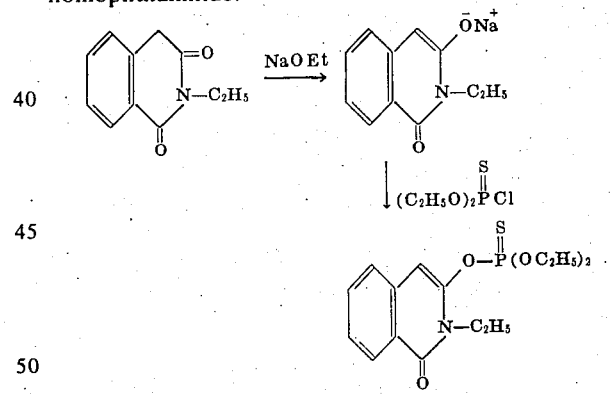

5.6 g. of the above sodium salt was stirred in 80 ml. of benzene and 4.5 g. of 0,0-diethyl-phosphorochloridothionate was added. The mixture was stirred and refluxed overnight, then shaken between benzene and water, and the benzene separated, dried and evaporated to give 3.6 g. of product as a dark red oil. The structure was supported by its NMR spectrum, having a triplet at 8.65τ, J = 7 cps, ($POCH_2CH_3$), a triplet at 8.58τ, J = 7 cps (N-$CH_2CH_3$), a quartet at 5.95τ, J = 7 cps (N-$CH_2CH_3$), a multiplet at 5.73τ, ($POCH_2CH_3$) and a multiplet at 2.5τ, (ring protons). The integration of the NMR spectrum was commensurate with the assigned structure.

A particularly suitable embodiment of the present invention is the compound 0,0-diethyl-0-3-(N-ethyl-isoquinolin-1-on)yl thiophosphate. That is an embodiment used for illustrating this invention as set forth in the activity shown by such a compound in the results of insecticidal tests set forth in the Table following the test descriptions.

INSECTICIDE TESTING METHODS

DIP TEST

Mexican Bean Beetle — *Epliachna varivestis Mulsant*

Lima bean leaves of uniform size are momentarily dipped in a 500 ppm water-acetone solution of the test compound. When dry, the treated leaf is placed in a screened petri dish and exposed to 10 fourth instar larvae. The per cent mortality is recorded after 48 hours.

Southern Armyworm — *Prodenia eridania Cramer*

This test is carried out as described for the Mexican Bean Beetle, using 10 fourth instar larvae and observing mortality after 48 hours.

Two-Spotted Spider Mite—*Tetranychus telarius Linnaeus*

Infested trifoliate bean leaves (Henderson bush line) are selected that have as many as 20 adult mites per leaf. Leaves with mites attached are momentarily dipped into a 500 ppm emulsion, solution, or suspension of the test compounded and then placed (petiole only) in a 4 oz. bottle of water for observation. Per cent mortality is observed after 72 hours.

SPRAY TESTS

Housefly — *Musca domestica Linnaeus*

Adult houseflies are contained in 100 mm. petri dish screened cages and exposed to a spray of 10 ml. acetone solution of test compound. A concentration of 500 ppm is used, with 10 flies in each cage. Per cent mortality is observed after 24 hours.

Bean Aphid — *Aphis fabae*

This test is conducted in a manner similar to that used for the housefly. The test specimens are Nasturtium leaves infested with bean aphids.

SOIL MIX TEST

Southern Corn Rootworm

Prior to treatment, a mixture of 2 parts soil and 1 part sand is air dried for 2 or 3 days and screened through a 20 mesh sieve. 90g. of this is mixture is placed into 10 oz. waxed cups. 10 ml of a 30 ppm water-acetone solution of the test material is pipetted onto the soil and the cup is capped.

After 1 to 2 hours the cups are vigorously shaken. Two corn seedlings are placed near the bottom of the cup in the soil mixture and 5 second to third instar rootworm larvae are placed on the soil surface. The cups are again capped. Each treatment is replicated 2 times.

Per cent mortality is observed after 5 days.

TABLE

INSECTICIDAL ACTIVITY (PERCENT MORTALITY) OF 0,0-DIETHYL-0-3-(N-ETHYL-ISOQUINOLIN-1-ON)YL THIOPHOSPHATE AT 500 PPM

| Mexican Bean Beetle | Southern Armyworm | Two-Spotted Spider Mite | Housefly | Bean Aphid |
|---|---|---|---|---|
| 100 | 100 | 100 | 100 | 100 |

Southern Corn Rootworm
100 (at 30 ppm)

From the data in this table, it will be noted that the phosphate ester derivatives of N-substituted homophthalimides, specifically for purposes of demonstrating the insecticidal activity of the particularly suitable embodiment of Example 2, have a broad range of insecticidal activity. They are 100 percent effective against all insect species tested in contact dip, spray, and soil mix tests.

The compounds of this invention have been found to exhibit considerable biological activity and are especially potent insecticides when used against important agricultural pests. These compounds may be used in various ways to achieve biological action. They can be applied per se, as solids or in vaporized form, but are preferably applied as the toxic components in insecticidal compositions of the compound and a carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the insecticidal compositions. Non-limiting examples of liquid carriers include water; organic solvents such as alcohols, ketones, amides and esters; mineral oils such as kerosene, light oils, medium oils; and vegetable oils such as cottonseed oil. Nonlimiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the compounds of this invention utilized in insecticidal compositions will vary rather widely. It depends to some extent upon the type of composition in which the material is being used, the nature of the condition to be controlled, and the method of application (i.e., spraying, dusting, etc.). In the ultimate insecticidal composition, as applied in the field, insecticide concentrations as low as 0.0001 weight per cent of the total composition can be used. In general, compositions, as applied, containing about 0.05 weight per cent insecticide in either liquid or solid carrier give excellent results. In some case, however, stronger dosages up to about 10 weight per cent may be required.

In practice, insecticidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of insecticide desired for application. Other concentrates can be solutions that can be later diluted, e.g., with kerosene. Thus, it is within the contemplation of this invention to provide insecticidal compositions containing up to about 80 per cent, by weight of the composition, of an insecticidal compound of this invention. Accordingly, depending upon whether it is ready for application or it is in concentrated form, the contemplated insecticidal compositions contain between about 0.0001 per cent and about 80 per cent, by weight of the composition, of an insecticidal compound of this

What is claimed is:

1. A compound having the formula:

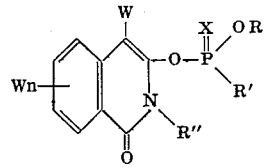

wherein R is alkyl ($C_1$–$C_3$), alkenyl ($C_2$–$C_4$), alkynyl ($C_2$–$C_4$) or phenyl, R' is OR, R'' is hydrogen or R, X is oxygen or sulfur, W is hydrogen, halogen, nitro, R, R', —COOR, —COR, and $n$ is 1.

2. A compound as defined in claim 1, wherein R is alkyl ($C_1$–$C_3$), R' is OR, R'' is R, X is sulfur, and W is hydrogen.

3. The compound as defined in claim 1 having the following structure:

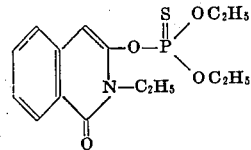

* * * * *